2,783,165
METHOD FOR APPLYING A PROTECTIVE COATING TO ARTICLES

Michael J. Borushko, Detroit, Mich., assignor, by mesne assignments, to Harding Chemical Corporation, Grosse Pointe Park, Mich., a corporation of Michigan No Drawing. Application August 31, 1953,
Serial No. 377,679

4 Claims. (Cl. 117—113)

This invention relates to a method for applying a protective coating to articles, and more particularly to a method for dip coating in which the articles are immersed in a black pigmented coating composition maintained at elevated temperature.

Paints, enamels, lacquers and similar surface coatings are normally intended for application or use at ordinary room temperatures, or at slightly elevated temperatures. In certain coating processes, however, it is necessary to maintain the coating composition at temperatures well above room temperature. One such process is described in detail in my Patent No. 2,515,489, granted July 18, 1950. In that process the coating composition is placed in a vat, the bottom of which is heated. The side walls of the vat extend some distance above the level of the coating bath and the upper section of the side walls is jacketed to facilitate cooling the space above the hot liquid coating by circulating a cooling fluid through the jacket. Substantially all of the solvent volatilized from the coating bath by the heat is condensed as it rises to this space, and in this manner is prevented from escaping to the atmosphere. Articles to be coated are dipped into the hot coating bath and removed to the upper cooled space of the vat where the solvent in the coating composition flashes off and is condensed.

Because the solvent is preserved, it is practical to employ the more expensive non-inflammable solvents in preparing coating compositions for use with this process. The solvents referred to are halogenated aliphatic hydrocarbons, for example: trichlorethylene, ethylene dichloride, perchlorethylene and carbon tetrachloride. These solvents are highly advantageous because they do not burn, but without solvent recovery means their relatively high cost makes their use uneconomical and impractical. Furthermore, their use with ordinary coating processes, e. g. spraying or room temperature dipping, would require the installation of expensive fume removal equipment to prevent the accumulation of their toxic vapors within the work rooms.

Attempts were made to utilize these advantageous non-inflammable solvents by substituting them directly for the conventional solvents (toluene, xylene, methyl acetate, etc.) used in standard carbon black pigmented paint, enamel, and lacquer compositions. The halogenated hydrocarbon solvents proved to be satisfactory substitutes for the conventional solvents at room temperature, but at elevated temperatures near the boiling range of the halogenated hydrocarbon solvent, the black pigment in the coating composition invariably flocculated. Obviously, this lack of heat stability rendered the coating composition unsuitable for use in the above-mentioned process. Peculiarly, coating compositions prepared with conventional solvents exhibited no evidence whatsoever of flocculation, even after prolonged heating at elevated temperatures. For example, a standard coating composition which consisted of 1.25 pounds of carbon black dispersed in a solution of 23.75 pounds of a medium oil length alkyd resin dissolved in 5 gallons of toluene was maintained at 100° C. for 4800 hours without any noticeable flocculation. The identical coating composition was prepared with trichlorethylene in place of the toluene solvent using the same procedure and proportions. But this composition completely flocculated after 4 hours at 80° C. Flocculation was evidenced by the agglomeration of the black pigment particles in the composition, changing the physical nature of the composition from a thin free-flowing liquid to a fluffy, soft, thixotropic mass entirely unsuitable for coating purposes. Furthermore, whereas the original liquids deposited smooth, glossy films, the flocculated material deposited dull, rough films. I have also found that even when trichlorethylene constitutes only a portion of the total solvent in such coating compositions, it will cause flocculation of the carbon black pigment. For example, in a composition in which the solvent consisted of 75% toluene and 25% trichlorethylene, flocculation occurred at elevated temperatures as rapidly as it did when the solvent consisted of trichlorethylene exclusively.

It is the object of my invention, therefore, to provide a hot dip coating process employing black pigmented coating compositions that remain stable for long periods of time at elevated temperatures in the range of the boiling point of the solvent for such compositions; that are non-inflammable; that deposit in a smooth, continuous film of uniform thickness on articles dipped into a heated bath thereof; that dry rapidly, and that are simply prepared by conventional paint techniques and in conventional equipment.

I have found that black pigmented coating compositions having these characteristics can be prepared using halogenated hydrocarbons as solvents if the black pigment is of the variety designated as lamp black. Lamp black has found some use as a pigment coloring substance in coating compositions, but the preferred black pigment for standard coating compositions is carbon (channel) black. As compared with lamp black, carbon black is usually preferred because it has better hiding power.

Lamp black is a well-known commercially available material and need not be described in detail in this specification. Suffice it to say that lamp blacks are prepared by burning oil in open pans by the free-flame method in the presence of an excess of air. This method is contrasted with that employed for producing carbon or channel blacks, normally used as coloring pigments, wherein a hydrocarbon is burned with a limited supply of air. Because the products in each case are relatively pure carbons, it was totally unexpected that they behave so differently in compositions containing chlorinated hydrocarbons.

The compositions used in my invention contain the usual constituents of paint compositions, including a pigment, a binder, or film forming material, and a volatile solvent. As indicated, the pigment is lamp black and the volatile solvent is a chlorinated hydrocarbon. The "binder" (which herein shall mean the non-volatile constituents of the coating other than the pigments and coloring matter) may be a drying oil, sometimes referred to as a vehicle, or a natural or synthetic resinous substance which is suitably plasticized. For example, the drying oil may be a linseed, China wood, castor, soybean, perilla or oiticica oil in raw, bodied, or blown form, dehydrated castor oil, or other similar animal, vegetable or mineral oils.

The resinous materials may include natural substances like ester, damar, cumar and run copal gums, gilsonite, asphalts, pitches, tars; or prepared substances like ethyl cellulose, cellulose aceto propionate, polystyrene, copolymers of vinyl chloride and vinyl acetate, polyacrylates, polymerized terpene resins, chlorinated rubber, rubber hydrochloride, long and short oil modified alkyd resins, rosin modified alkyd resins, polyvinyl butyral. Where required the resins may be suitably plasticized with conventional plasticizers such as dialkyl phthalates, tricresyl or triphenyl phosphates, chlorinated diphenyls, butyl stearate, diethylene glycol dipropionate.

In preparing paints, lacquers, enamels and similar coating compositions for use with my invention, I follow procedures commonly used and known in the organic coatings industry. In general, I prefer to make a concentrated dispersion of the pigment in a portion of the total binder dissolved in a portion of the solvent. The pigment is suitably dispersed by any one of the several known dispersing means, for example, a ball mill, a Bramley mill, or a roller mill. A ball mill is preferred as the quality of dispersion obtainable is superior. The ball mill offers the additional advantage of being sealed during the dispersing operation, thus avoiding the loss of solvent to atmosphere.

Detailed examples of the preparation of my compositions follow. In the examples all proportions are recited as parts by weight.

Example 1

Thirty-five parts of a short oil alkyd resin, such as Reichhold Chemical's #3 Solid Beckasol, were dissolved in 65 parts of trichlorethylene. This solution was then charged into a steel ball mill with 7 parts of lamp black. The ball mill was sealed and rotated at about 42 R. P. M. for about 48 hours, or until a smear of the composition on a glass plate indicated that the pigment was thoroughly dispersed. An addition was then made of 106 parts of a 50% solution of the same resin in trichlorethylene. The ball mill was again sealed and allowed to rotate for about an hour, or until the new resin solution was thoroughly blended with the original paste grind. The mill was then discharged into suitable containers, preferably through a cloth filter to remove any dirt or foreign material that may have entered at an earlier stage of the process. The resulting composition contained about 45% solids with a pigment-binder ratio of approximately 7½% pigment to 92½% resin. This was reduced further with trichlorethylene to the concentration at which it was intended to be used.

Example 2

Twenty-two parts of lamp black and 78 parts of kettle body linseed oil were thoroughly mixed in a pony mixer, and the mixture given one pass through a five-roll mill to provide a smooth dispersion of the lamp black in the oil. A solution was prepared by dissolving 1500 parts of gilsonite and 400 parts of heavy bodied linseed oil in 4200 parts of trichlorethylene. The paste was added to the solution in the proportions of 100 parts of paste to 6000 parts of solution to produce a black japan, films of which dried to touch merely by loss of solvent. Deposited films of great toughness were obtained by baking the painted part in an oven.

Example 3

A lacquer-type coating was prepared as follows. A ball mill was charged with 100 parts of a 100% phenolic oil reactive resin, such as Bakelite resin BR254, 45 parts of dibutyl phthalate and 175 parts by weight of trichlorethylene. The ball mill was sealed and allowed to rotate until the resin and dibutyl phthalate were thoroughly dissolved in the trichlorethylene. Twenty parts by weight of lamp black were then added, and the ball mill rotated for about 48 hours, or until the lamp black was thoroughly dispersed. Further addition was then made of 100 parts by weight of ethyl cellulose (Hercules grade N22) and 225 parts of trichlorethylene. The ball mill was then sealed and rotated until the additions were dissolved and dispersed in the original paste. The resulting composition was then withdrawn from the mill ready for use. Additional trichlorethylene was added where the particular use required a thinner lacquer.

The coating compositions of Examples 1-3 were all used in coating metal parts by dipping them in a hot bath of the composition and removing the coated part to a vapor-free zone above the level of the bath to permit the solvent to evaporate. After drying, the deposited film in each case was glossy, smooth, free of all bubbles and surface imperfections, and of uniform thickness over the surface of the metal part. The compositions remained stable, and although subjected to 85° to 90° C. for extended periods of time, no flocculation or deterioration of the composition was noticed. During this period the solids content of the composition was replenished from time to time to make up for the solids deposited on the parts being treated.

Other halogenated hydrocarbons such as ethylene dichloride, perchlorethylene, carbon tetrachloride, may be substituted for all or part of the trichlorethylene given in the above examples, following the same procedures for preparing the desired compositions.

The proportion of lamp black present in the compositions of this invention is not critical and is selected in accordance with the desired degree of hiding power or opacity. Normally, from 2 to 15% by weight of lamp black based on the weight of the binder and other non-volatile constituents is employed, although if there is a need, an even higher proportion of black can be used. Other pigments and combinations of non-volatile material may be utilized with the lamp black and conventional binder in accordance with usual practices in the coatings industry. The total solids content of the composition is not critical and may range from 20 to 50% by weight.

The coating compositions described are stable at temperatures of from 80° C. to 100° C. almost indefinitely. Extended tests indicate that no flocculation will occur for periods of one year and more. While the coating process of the invention is intended primarily for use on metal articles, it may also be used to coat articles of wood, leather and other non-metallic materials which are not attacked by the solvents.

From the foregoing description it is apparent that the invention provides an improved process employing a black-pigmented coating composition which has all the advantages of conventional coatings, and in addition is non-inflammable and completely operative at elevated temperatures.

I claim:

1. A method for coating an article comprising dipping the article into a heat stable coating composition consisting essentially of an organic film-forming binder containing approximately 2–15% by weight of lampblack in admixture with a halogenated aliphatic hydrocarbon solvent, said composition having a total solids content of 20–50% and being maintained at a temperature approaching the boiling point of said solvent, withdrawing the article from the bath, said article having a surface temperature approximately that of the boiling point of said solvent, and permitting the solvent freely to volatilize thus providing a smooth uniform film on the article.

2. The method of claim 1 wherein the solvent is trichlorethylene.

3. The method of claim 1 wherein the solvent is perchlorethylene.

4. The method of claim 1 wherein said film-forming binder is a plasticized phenolic-oil resin and said solvent is trichlorethylene.

References Cited in the file of this patent

UNITED STATES PATENTS

| | | |
|---|---|---|
| 1,090,440 | Aylsworth | Mar. 17, 1914 |
| 1,889,429 | Wiegand | Nov. 29, 1932 |
| 2,028,126 | Warren | Jan. 14, 1936 |
| 2,515,489 | Borushko | July 18, 1950 |

FOREIGN PATENTS

| | | |
|---|---|---|
| 300,610 | Great Britain | June 8, 1929 |